United States Patent [19]

Reynolds

[11] E Re. 30,529

[45] Reissued Feb. 24, 1981

[54] MANUFACTURE OF NAPHTHENIC TYPE LUBRICATING OILS

[75] Inventor: Ronald W. Reynolds, Wilmington, Del.

[73] Assignee: Sun Oil Company of Pennsylvania, Philadelphia, Pa.

[21] Appl. No.: 78,616

[22] Filed: Sep. 24, 1979

Related U.S. Patent Documents

Reissue of:

[64] Patent No.: 4,100,056
Issued: Jul. 11, 1978
Appl. No.: 754,284
Filed: Dec. 27, 1976

[51] Int. Cl.[3] ..... C10G 41/00

[52] U.S. Cl. ..... 208/57; 208/18; 208/92; 209/111

[58] Field of Search ..... 208/18, 57, 92, 93

[56] References Cited

U.S. PATENT DOCUMENTS

| | | | |
|---|---|---|---|
| 3,902,988 | 9/1975 | Bennett et al. | 208/18 |
| 3,926,786 | 12/1975 | Coleman et al. | 208/18 |
| 3,929,616 | 12/1975 | Mead et al. | 208/18 |

*Primary Examiner*—Herbert Levine
*Attorney, Agent, or Firm*—J. Edward Hess; Donald R. Johnson; Paul Lipsitz

[57] ABSTRACT

A process for making naphthenic type lubricating oils from a low VI waxy crude which comprises distilling said low VI waxy crude to 500° to 650° F. at atmospheric pressure to separate distillable fractions therefrom, subjecting the residue to a vacuum distillation at about 25 to about 125 mm Hg absolute pressure to obtain one or more gas oil fractions, optionally hydrotreating said gas oil fractions in the presence of a Ni/Mo catalyst at 550° to 650° F., 0.25 to 1.0 LHSV, and 700–1500 psig, and catalytically dewaxing said distillates in the presence of a H+ form mordenite catalyst containing a Group VI or Group VIII metal at 550° to 750° F., 500 to 1500 psig and 0.25 to 5.0 LHSV, to obtain said naphthenic type oils having pour points of from about −60° to +20° F.

6 Claims, 1 Drawing Figure

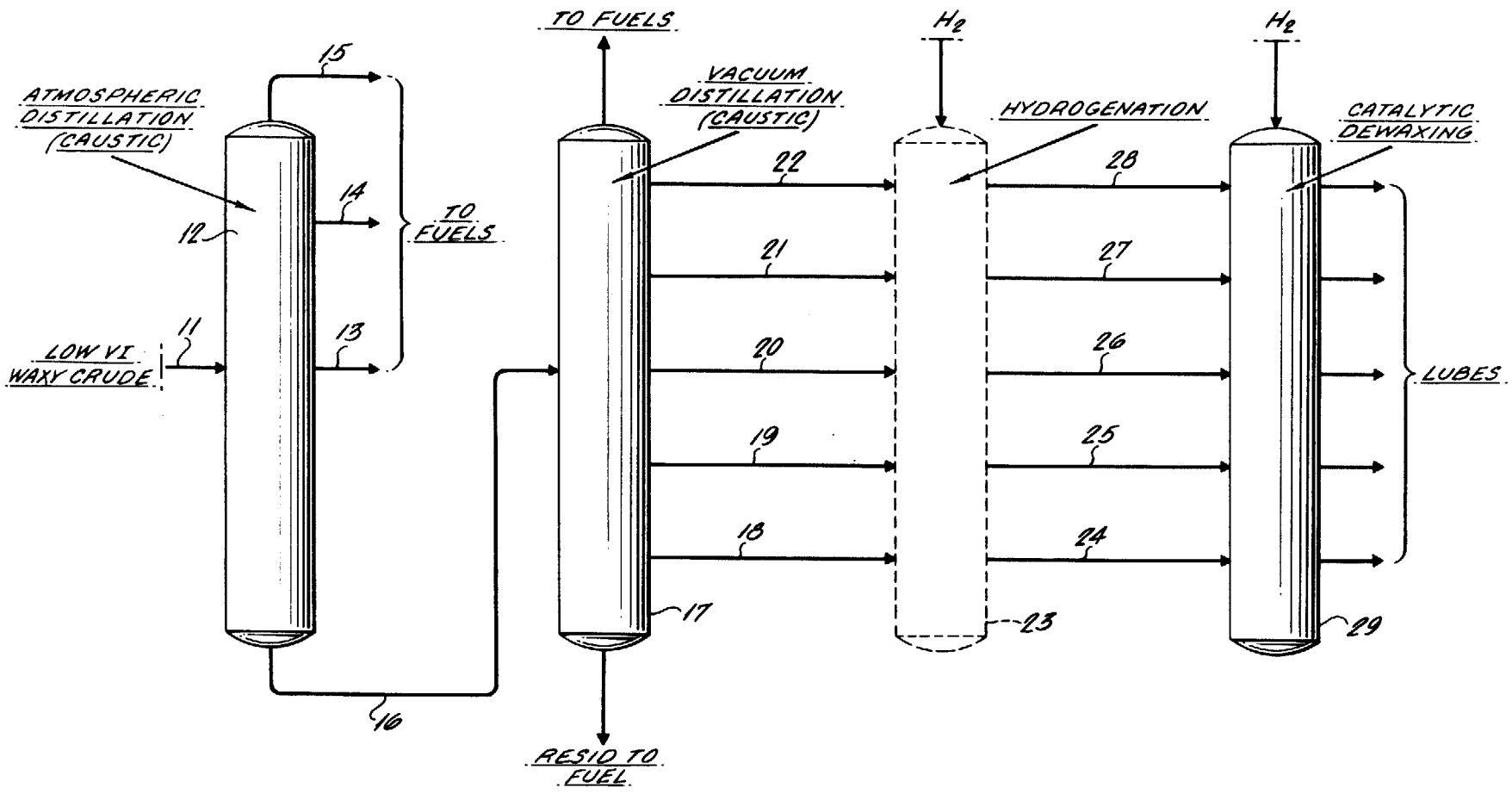
CATALYTIC DEWAXING
LUBES
$H_2$
29
HYDROGENATION
28
27
26
25
24
23
$H_2$
VACUUM DISTILLATION (CAUSTIC)
22
21
20
19
18
17
TO FUELS
RESID TO FUEL
TO FUELS
15
14
13
16
12
11
ATMOSPHERIC DISTILLATION (CAUSTIC)
LOW VI WAXY CRUDE

MANUFACTURE OF NAPHTHENIC TYPE LUBRICATING OILS

Matter enclosed in heavy brackets [ ] appears in the original patent but forms no part of this reissue specification; matter printed in italics indicates the additions made by reissue.

Naphthenic lubricating oils are conventionally made from grade A or coastal, wax-free crudes by simple distillation of the crude in the presence of caustic. Due to such simple processing they have been relatively inexpensive.

Naphthenic oils have naturally low pour points of from −50° F. in low viscosity grades to +20° F. in high viscosity grades. Their viscosity Index (VI) is poor, but, in many applications, this quality is secondary to cost considerations. There are also some applications where the particular properties of naphthenic lubes (very low pour point and relatively high content of aromatic compounds) make them desirable in spite of any price advantage.

Solvent lubricating oils are made from waxy crudes. They require a complicated refining scheme and are, therefore, more expensive. VI is high and pour points of finished oils (after dewaxing) run 0 to +10° F. These lubes must be manufactured from selected waxy crudes, i.e., those with VI high enough to give at least 90–95 VI levels in the finished oils. Waxy crudes with lower VI potential are rejected for solvent lube manufacture and utilized only for fuels.

This invention is directed to a process for manufacturing relatively inexpensive naphthenic type lubes from the low VI waxy crudes unsuitable for solvent lubes and now used for gasoline and fuels. Such a process is desirable because reserves of grade A or coastal crudes are seriously declining and no new fields of these grades have been discovered. Thus, the process of this invention will permit crudes now going to fuels to fill this gap while saving high VI solvent lube crudes for applications where their special qualities are required.

In essence, the process of the invention involves the steps of distilling a low VI waxy crude at atmospheric pressure up to a temperature of about 650° F. to remove the distillable fraction therefrom, vacuum distilling the residue to obtain gas oil fractions and catalytically dewaxing the gas oil fractions having an SUS at 100° F. viscosity of from about 60 to about 2000 to obtain the naphthenic type lubricating oil product. Optionally, prior to the catalytic dewaxing step the gas oil fractions may be hydrogenated if it is desired to improve color and/or remove nitrogen and sulfur compounds which is desirable for enhanced product quality or to avoid the adverse effects of sulfur and nitrogen on the dewaxing catalyst.

Reference is now made to the drawing where the process of the invention is illustrated in more detail. The crude is first taken through line 11 to a still 12 and distilled at atmospheric pressure up to a temperature of about 650° F. and distillates are sent to fuels manufacture as shown by lines 13, 14 and 15. The residual crude is taken through line 16 to still 17 and vacuum distilled at about 25 to about 125 mm of mercury pressure (absolute) to give several gas oils of desired viscosities. The atmospheric and vacuum distillation columns may include caustic scrubbing zones to remove undesirable acids in the crude. The vacuum gas oils may next be taken through appropriate lines, shown in the FIGURE as lines 18 to 22 to an optional hydrotreater 23 and hydrotreated to improve color and remove nitrogen and sulfur compounds. Whether or not hydrotreating will be used depends on the properties of the specific crudes used along with the desired end uses for the finished lubes. If used, the operating conditions for the hydrotreating step are:

Temperature, °F.: 550°–650°
$H_2$ pressure, Psig: 700–1500
LHSV: 0.25–1.0
Catalyst: Commercially available Ni-Mo Finally, the distillates are taken through lines 24 to 28 to a dewaxer 29 where they are catalytically dewaxed to meet pour point specifications. This is accomplished by mixing the oil with hydrogen and contacting it with a catalyst at elevated temperature and pressure. Normal paraffins and nearly normal paraffins are preferentially cracked to gases and low boiling liquids which may be removed by distillation (not shown). Operating conditions are:

Temperature, °F.: 500°–750°
$H_2$ pressure, Psig: 500–1500
LHSV: 0.25–5.0
$H_2$ recycle, SCF/bbl: 1,000–10,000

The catalyst used is an alumino-silicate of the mordenite class. It must be decationized, that is $Na+$ ions replaced with $H+$ ions, to be active for this application. A commercially available example of $H+$ mordenite is Norton Company's Zeolon H. A group VI or VIII metal such as platinum or palladium is added to the hydrogen mordenite to give the final catalyst. In an alternate catalyst, sulfur also may be added to the $H+$ mordenite by using a sulfuric acid treatment before adding the group VI or VIII metal. The sulfur addition is readily accomplished by slurrying $H+$ mordenite with $H_2SO_4$ at 90° C. for 5 hours. After filtration to remove excess $H_2SO_4$ liquid, the acid laden mordenite is heated in a programmed manner to 480° C. to volatilize acid. Final catalyst contains at least 0.05 wt. % sulfur and more typically 2–4 wt. %.

The catalytic dewaxing operation is preferably carried out in a fixed bed, trickle flow reactor. High pressure and low pressure separators remove hydrogen and hydrocarbon gases from the effluent. A vacuum stripper removes products of hydrocracking boiling lower than the feed. Severity is adjusted to meet the spedific pour point target of each distillate.

Catalytic dewaxing severity would be adjusted to give the following pour points for the particular viscosity grades from the vacuum distillation:

| Viscosity Grade (SUS @ 100° F.) | Dewaxed Pour Point (F.°) |
|---|---|
| 60 | −50 |
| 100 | −40 |
| 500 | −10 |
| 2000 | +10 |

A specific example of the type of crude for which this invention is useful is Nigerian Medium. Nigerian Medium may be contrasted with naphthenic crude and high VI waxy crude as follows:

| | Amelia A/ Perkins A (Typical Naphthenic Crude) | Nigerian Medium (Low VI Waxy Crude) | Zarzaitine (Typical High VI Waxy Solvent Lube Crude) |
|---|---|---|---|
| Crude Properties | | | |
| °API | 24.0 | 26.1 | 42 |
| WT. % wax | 0.3 | 3.0 | 4.0–5.0 |
| 650–1070° F. Fraction | | | |
| Vol. % crude | 36 | 34 | 22.5 |
| WT. % wax | .4–.5 | 8 | 13–15 |
| Dewaxed saturates VI | 20–40 | 75 | 104 |

Nigerian Medium lacks the VI potential to make a 95 VI solvent lube, but it contains wax and, thus, conventionally would only be used for fuel manufacture. By using the process of this invention, an inexpensive lube of intermediate VI quality may be manufactured from Nigerian Medium crude. Other useful crudes include Trinidad Light, Garden Island Bay and Lake Washington (Louisiana Crudes), Thompson, Webster and Hawkins (Texas Crudes), which crudes contain wax and cannot by prior art methods yield 90 VI solvent lubes.

In order to further illustrate the invention the following examples are given:

EXAMPLE 1

A sample of Nigerian Medium crude was distilled in a commercial atmospheric distillation unit containing a caustic scrubbing zone to give the following streams:

| Stream | Approx. B. Pt. (°F.) | Vol. % on Crude |
|---|---|---|
| Wet gas | To 250° | 6.0 |
| Straight run gasoline | | |
| Naphtha | 250°–420° | 8.0 |
| Atmospheric gas oil | 420°–520° | 22.0 |
| Residue | 520°+ | 64.0 |

The residue was then distilled in a commercial vacuum distillation unit also containing a caustic scrubber at 25 to 120 mm of mercury pressure (absolute) to give the streams shown in Table I.

TABLE I

| Stream No. | Vol % of Crude | D1160 Distill, °F. 10% | 90% | °API | VIS SUS/ 100° F. | Ppm Sulfur | Pour Pt. | D-1500 Color |
|---|---|---|---|---|---|---|---|---|
| 1 | 13.0 | — | — | — | — | — | — | — |
| 2 | 3.5 | 578 | 707 | 23.9 | 64 | 2000 | +12 | 1.0 |
| 3 | 11.0 | 608 | 787 | 22.8 | 124 | 1700 | +44 | 1.75 |
| 4 | 5.0 | 704 | 871 | 20.7 | 560 | 2400 | +71 | 2.75 |
| 5 | 11.0 | 773 | 956 | 18.9 | 2000 | 2400 | +88 | 4.0 |
| 6 | 5.0 | 813 | 1064 | 18.1 | 5000 | 3200 | +94 | 6.5 |
| Caustic Sludge | 2.0 | — | — | — | — | — | — | — |
| Vac-Residue | 13.5 | — | — | — | — | — | — | — |

Streams 2 through 6 were then hydrotreated using a commercially available Ni-MO catalyst (American Cyanamid HDS-9 Trilobe). The hydrotreating was conducted at a reactor temperature of 650° F., hydrogen pressure of 900 psig, a liquid hourly space velocity (LHSV) of 1.0, and a hydrogen recycle of 150 to 200 SCF/Bbl. After hydrotreating the sulfur content was seen to have been reduced and color was improved while pour point remained the same. The properties of the streams from the hydrotreater are shown in the following table:

| Stream | Ppm Sulfur | D 1500 Color | Pour Point of |
|---|---|---|---|
| 2 | 96 | 0.75 | +12 |
| 3 | 225 | 1.25 | +42 |
| 4 | 393 | 1.50 | +70 |
| 5 | 503 | 2.25 | +88 |
| 6 | 626 | 2.75 | +94 |

The above hydrotreated streams were then catalytically dewaxed using a commercially available mordenite catalyst in hydrogen from (Norton Zeolon H) to which had been added 0.5% by weight of platinum. The dewaxing was carried out in a fixed bed trickle flow reactor operated at 550° to 600° F., a hydrogen pressure of 850 psig, liquid hourly space velocity of 0.8 to 1.0 and a hydrogen recycle of 5000 to 9000 SCF/Bbl. The following table shows the yields of naphthenic-type lubricating oil products obtained and their pour points.

| Stream | Yield, Wt. % of Charge $C_1$–$C_5$ | $C_5$–IBP | IBP | Product Pour Pt. °F. |
|---|---|---|---|---|
| 2 | 3.5 | 4.5 | 92.0 | −60 |
| 3 | 2.0 | 2.0 | 96.0 | −40 |
| 4 | 5.0 | 3.0 | 92.0 | −30 |
| 5 | 2.5 | 3.0 | 94.5 | +08 |
| 6 | 1.5 | 0.5 | 98.0 | 70 |

As can be seen from the above table, Streams 2 to 5 yield a product fully meeting the specifications for naphthenic type lubricating oils. With extremely heavy grades such as stream 6 where the SUS/100° F. viscosity is 5000, the product obtained exceeds the pour point specification for the naphthenic type lubricating oils and such heavy grades from the vacuum distillation or optional hydrogenation step, rather than be subjected to catalytic dewaxing, would be used in other refinery operations or could be dewaxed by solvent dewaxing.

The invention claimed is:

1. A process for making naphthenic type lubricating oils from a low VI waxy crude *unsuitable for solvent lubes* which consists of distilling said low VI waxy crude to 500° to 650° F. at atmospheric pressure to separate distillable fractions therefrom, subjecting *all of* the residue to a vacuum distillation at about 25 to about 125 mm Hg absolute pressure to obtain one or more distillate fractions having an SUS at 100° F. viscosity of from about 60 to about 2000, and catalytically dewaxing [all of] said [distillates] *distillate fractions* in the presence of an H+ form mordenite catalyst containing a Group VI or Group VIII metal at 550° to 750° F., 500 to 1500 psig and 0.25 to 5.0 LHSV to obtain said naphthenic type oils having a pour point of from about −50° to +20° F.

2. The process of claim 1 where the low VI waxy crude is Nigerian Medium.

3. The process of claim 1 where catalytic dewaxing is carried out in a fixed bed, trickle flow reactor.

4. The process of claim 1 where sulfur is added to the H+ mordenite catalyst.

5. A process for making naphthenic type lubricating oils [fom] *from* a VI waxy crude which consists of atmospherically distilling said crude to remove wet gas, straight run gasoline, naphtha and atmospheric gas oil fractions, subjecting the residue to a vacuum distillation at about 25 to 120 mm mercury pressure absolute to obtain gas oil fractions having an SUS at 100° F. viscosity of from about 60 to about 2000, hydrotreating said gas oil fractions in the presence of a Ni/Mo catalyst at about 650° F., a hydrogen pressure of about 800 psig and a LHSV of about 1.0, and catalytically dewaxing said hydrotreated gas oil fractions in the presence of an $H^+$ form mordenite catalyst containing platinum at a temperature of about 550° to about 600° F., a hydrogen pressure of about 850 psig, and a LHSV of from about 0.8 to about 1.0 to obtain naphthenic type oils having a pour point of from about −60° to about 20° F.

6. The process of claim 5 where the low VI waxy crude is Nigerian Medium.

* * * * *